Jan. 15, 1952     E. F. MARTINET     2,582,446

AIRTIGHT TUBULAR COUPLING

Filed July 21, 1950

INVENTOR.
Eugene F. Martinet
BY
Freare and Bishop
ATTORNEYS

Patented Jan. 15, 1952

2,582,446

UNITED STATES PATENT OFFICE 2,582,446

AIRTIGHT TUBULAR COUPLING

Eugene F. Martinet, Cleveland, Ohio, assignor to Royal Vacuum Cleaner Company, Cleveland, Ohio, a corporation of Ohio Application July 21, 1950, Serial No. 175,049

5 Claims. (Cl. 285—174)

The invention or discovery relates to airtight tubular couplings, and in particular to airtight tubular couplings adapted for use for making airtight connections between suction cleaner attachment parts such as hose, tubes, nozzles, and the like, in various combinations.

More particularly, the invention or discovery includes improvements in the airtight tubular couplings set forth in my U. S. Letters Patent No. 2,245,151, each embodiment of which constitutes an automatic detent connectable and disconnectable separable tubular coupling including two tubular members arranged for separable telescoping jointure with each other, a spring pressed detent member operatively mounted on one of the tubular members, the other tubular member having formed therein a recess adapted to receive the detent member, the detent member and the recessed tubular member having sloping surfaces for impinging with each other for displacing the detent member during successive movements of the telescoping tubular members wtih respect to each other, and by which when the coupling is being assembled, straight longitudinal telescoping movement of the inner tubular member into the outer tubular member serves automatically to displace the detent from its protruding position until the detent registers with and springs into the recess and connects the tubular members.

Furthermore, in my said Patent No. 2,245,151, in separating the assembled coupling, the telescoped tubular members are twisted about their longitudinal axes and the detent is displaced from its connecting projection into the recess, thereby permitting the telescoped tubular members to be pulled apart.

Moreover, in my said Patent No. 2,245,151, a resilient preferably rubber closure sleeve is located on one of the tubular members in airtight engagement therewtih, the rubber sleeve extending from the one tubular member beyond the end thereof in separable or removable airtight engagement with the other tubular member when the tubular members are in connected positions.

In the airtight tubular couplings of my said Patent No. 2,245,151, the spring pressed detent member is preferably operatively mounted on the inside of the inner telescoping member, thereby avoiding the scratching of the outer surface of the inner tubular member which otherwise occurs when the detent member is mounted on the outer telscoping tubular member.

However, the disconnecting of the coupling set forth in my Patent No. 2,245,151, by twisting involves two difficulties. First, the recess or slot in one member receiving the detent in the other member is elongated and permits swiveling of the coupling which in some instances is desired, but the advantages of my prior construction cannot be obtained where swiveling is not desired. Second, the prior construction automatically disconnects upon the limit of swiveling movement in either direction. Because of this characteristic, the coupling frequently accidentally becomes disconnected upon accidental swiveling or twisting at a time when disconnection is not desired. In other words, the coupling of my prior construction is not positively connected at all times excepting when a control member is intentionally positively actuated to permit disconnection.

The objects of the present improvements include the provision of an airtight tubular coupling having all the advantages of the tubular coupling of my said Patent No. 2,245,151, and which does not require twisting of the telescoped tubular members with respect to each other to effect disconnection of the telescoped tubular members.

Furthermore, it is an object of the present invention to provide a detachable airtight tubular coupling construction which is positively locked, which cannot become accidentally disconnected, and which only may be disconnected upon positive intentional actuation of the locking detent.

Also, it is an object of the present invention to provide an improved detachable airtight tubular coupling construction in which in one embodiment the coupled elements are retained coupled at all times in fixed position against relative swiveling movement.

Furthermore, it is an object of the present invention to provide an improved detachable airtight tubular coupling construction in which the latch mechanism is sealed, and in which the sealing mechanism functions as the latch operating device.

Finally, it is an object of the present invention to provide an improved detachable airtight tubular coupling construction having a very simplified arrangement of parts permitting most economical manufacture and convenience in use.

The foregoing and other objects are attained by the tubular couplings, parts, combinations, and sub-combinations which comprise the present invention, and the nature of which is set forth in the following general statement, and preferred embodiments of which are set forth in the following description, and which are particularly and distinctly pointed out and set forth in the appended claims forming part hereof.

The nature of the improved tubular coupling of the present invention and discovery may be stated in general terms as including two tubular members arranged for separable telescoping jointure with each other, one of the tubular members being an outer tubular member and the other tubular member being an inner tubular member when the tubular members are telescoped. The inner and outer tubular members each have formed therein an aperture registrable with the aperture of the other. A detent member is located in the aperture of the inner tubular member and extendable into the aperture of the outer tubular member when the apertures are registered with each other. Spring means on the inside of the inner tubular member support the detent member in the aperture of the inner tubular member and resiliently urge the detent member outwardly.

A resilient preferably rubber closure sleeve is located on the outer tubular member in airtight engagement therewith. The rubber sleeve extends beyond the end of the outer tubular member, and the closure sleeve includes a gripping ring portion beyond the outer end of the outer tubular member, and the gripping ring portion is adapted for making a gripping closure engagement with the entire circumference of the inner tubular member. The inner surface of the closure sleeve has a cavity formed therein. The cavity opens over the aperture of the outer tubular member, and the closure sleeve includes a circumferential rib located above the aperture of the outer tubular member, and the rib is adapted for being pressed downwardly against the outer end of the detent member when the tubular members are connected with each other, so as to press the detent member inwardly and permit withdrawal of the inner tubular member from the outer tubular member.

By way of example, preferred embodiments of the improved tubular coupling and parts thereof are illustrated in the accompanying drawings forming part hereof, in which.

Similar numerals refer to similar parts throughout the drawings.

Figure 1:
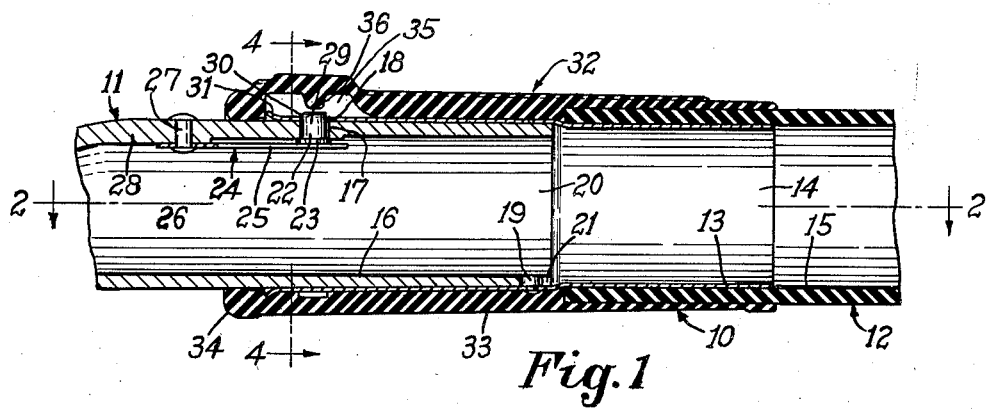
Fig. 1 is a longitudinal sectional view, as on line 1—1 Fig. 2, of one embodiment of the improved tubular coupling hereof, outer portions of the connected members being broken away, and the parts of the tubular coupling being shown in their respective positions when connected.

The embodiment of the improved airtight tubular coupling hereof, shown in Figs. 1 to 5 inclusive, is indicated generally by 10 and as shown is a non-swivel coupling which separably connects a suction cleaner nozzle indicated generally by 11 with one end of a suction cleaner hose indicated generally by 12. The suction cleaner nozzle 11 is shown only fragmentarily and may be any usual suction cleaner nozzle. Similarly, the suction cleaner hose 12 is shown fragmentarily, and may be any usual length, and have another end not shown which may be connected by a usual coupling which may or may not be one of the couplings 10 with an adapter of a tank type suction cleaner, or a portable suction cleaner either of which may be of usual construction and arrangement.

The improved airtight tubular coupling 10 includes an outer tubular member 13 having one end 14 telescoped within and having an airtight fit with the illustrated end 15 of the hose or flexible tube 12, and the tubular member 13 may be otherwise termed an adapter tube. The improved airtight tubular coupling 10 furthermore includes an inner telescoping tubular member 16 which as shown is an integral part of the nozzle 11, and constitutes the discharge tube thereof.

The inner tubular member 16 has formed therein an aperture 17, and the outer tubular member 13 has formed therein an aperture 18, and the apertures 17 and 18 are registrable with each other. The aperture 17 is cylindrical, the wall of the tubular member 16 having a substantial thickness as shown, and the aperture 18 is circumferentially elongated.

Preferably as shown for facilitating the registration of the apertures 17 and 18 with each other, an inwardly extending guide pin or head 19 protrudes from the inner face of the tubular member 13 intermediate its ends and the extremity 20 of the tubular member 16 has formed therein a notch 21. The guide pin 19 and notch 21 are arranged and located with respect to each other so as to register the apertures 17 and 18 with each other when the inner tubular member 16 is telescoped within the outer tubular member 13 as shown in Figs. 1, 2, 4, and 5.

A detent member 22 is located in the aperture 17 of the inner tubular member 16, and the detent member 22 is extendable into the aperture 18 of the outer tubular member when the apertures 17 and 18 are registered with each other. As shown the detent member 22 has an enlarged head 23 on its inner end in the bore of the tubular member 16, the head 23 serving as a stop for limiting the outward movement of the detent member 22. Spring means indicated generally by 24 on the inside of the inner tubular member 16 support the detent member 22 in the aperture 17 of the inner tubular member 16 and resiliently urge the detent member 22 outwardly.

As shown the spring means includes a flat spring 25 located within the bore or tubular passageway 26 of the tubular member 16. One end of the flat spring 25 abuts against the enlarged head 23 of the detent member 22, and the other end of the flat spring 25 is secured as by a rivet 27 to the tubular wall 28 of the tubular member 16.

Figure 3:
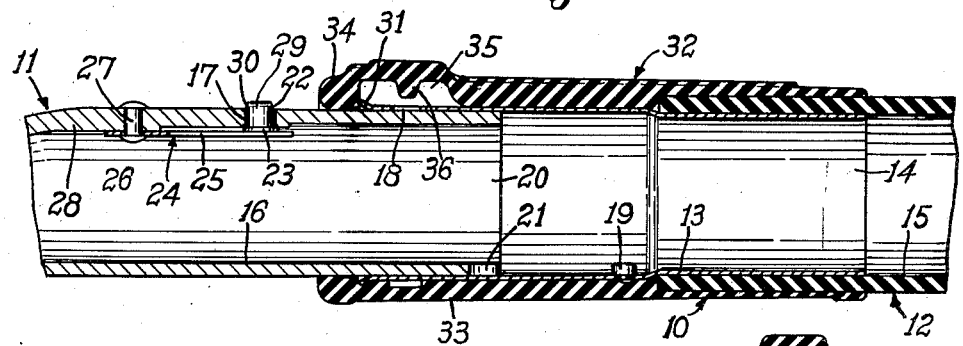
Figs. 3 are views similar to Fig. 1, showing the parts of the tubular member disconnected from each other.
Figure 4:
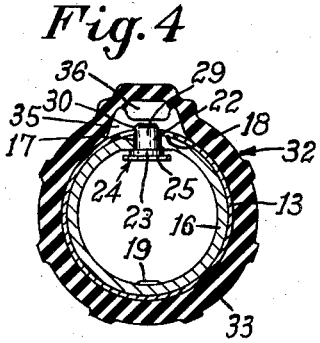
Fig. 4 is a transverse sectional view as on line 4—4, Fig. 1.

The detent member 22 includes a shank 29 extending outwardly from the enlarged head 23. The outer end face of the shank 29 is formed with a curved peripheral corner portion 30, and the shank 29 is urged by the flat spring 25 outwardly so as to locate the outer end of the shank 29 and its curved peripheral corner portion 30 beyond the outer face of the tubular member 16 when the tubular members 16 and 13 are separated as shown in Fig. 3 and when the tubular members 16 and 13 are connected as shown in Figs. 1 and 4. When the tubular members 16 and 13 are connected the shank 29 extends in locking engagement through the registered apertures 17 and 18.

Figure 2:
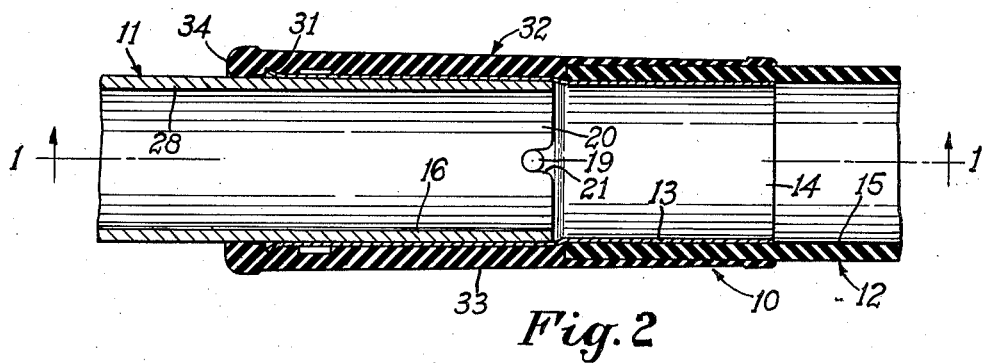
Fig. 2 is a longitudinal sectional view thereof as on line 2—2, Fig. 1.

Preferably as shown the tubular member 13 is formed with an outwardly flaring end portion 31 which serves to facilitate in depressing the detent member 22 when the tubular member 16 is inserted in the tubular member 13 with the notch 21 in alignment with the guide pin 19. After the complete telescoping of the tubular member 16 into the tubular member 13 the parts of the tubular coupling 10 assume their engaged positions as shown in Figs. 1, 2, and 4, with the detent member 22 extending through the registered apertures 17 and 18.

Combined means for air sealing the connected tubular members 16 and 13 and for effecting release of the connected tubular members is provided by an improved elongated resilient preferably rubber closure sleeve indicated generally by 32, and including a body portion 33 making a circumferential closure on the outer tubular member 13 and having an enlarged resilient gripping ring portion 34 located beyond the end of the tubular member 13 and making a gripping closure engagement with the entire circumference of the inner tubular member 16 when the tubular members 16 and 13 are connected with each other. In the inner surface of the closure sleeve 32 there is formed a cavity 35, and within the cavity 35 the closure sleeve 32 includes a circumferential rib 36 located above the aperture 18 as shown in Figs. 4 and 5.

Figure 5:
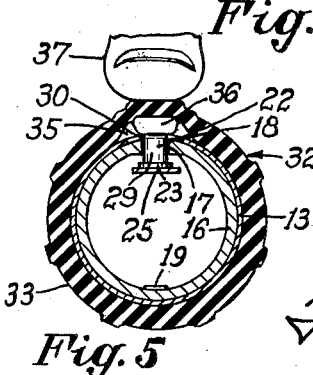
Fig. 5 is a view similar to Fig. 4 showing the rib of the closure sleeve pressed against the outer end of the detent member.

For effecting disengagement of the parts of the airtight coupling 10, as shown in Fig. 5, the thumb 37 of the user is pressed against the outside of the body portion 33 and against the outside of the circumferential rib 36, pressing the inner edge of the rib 36 against the outer end of the detent member 22 so as to bring its curved peripheral corner portion 39 within the aperture 18 as shown in Fig. 5, whereby pulling the tubular members 13 and 16 longitudinally without twisting, serves to disengage the parts of the improved coupling 10.

Thus the curved corner portion 39 of the detent member 22 cams or rides over the edges of the aperture 18 when in the position shown in Fig. 5 to permit disengagement of the coupling and it likewise cams or rides over the flared end 31 of the tubular member 13 when the coupling parts are being connected or telescoped together.

Furthermore, the corner portion 39 of the spring pressed detent 22 in being curved, does not scratch the surface of tubular member 13 in connecting or disconnecting the coupling; and eliminates a sharp edge which might scratch furniture and the like when the coupling is disconnected and the end portion of the detent 22 should happen to strike such furniture. Detent 22 is supported by the spring 25, as described, and is preferably permanently mounted on the spring, athough it may be loosely mounted thereon if desired.

Figure 6:
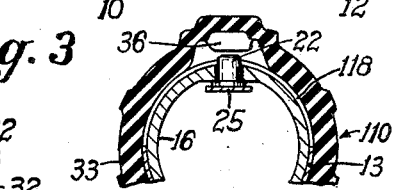
Fig. 6 is a fragmentary view similar to Fig. 4 illustrating a second embodiment of the improved tubular coupling hereof.

The embodiment of the improved airtight tubular coupling shown in Fig. 6 is indicated generally by 110 and is adapted for swiveling. The construction of the swiveling coupling 110 is identical with the construction of the non-swiveling coupling 10 with the exception that in the coupling 110 there is no guide pin 19 and no notch 21. Also in the coupling 110 there is provided in the outer tubular member 13 a circumferentially elongated aperture 118 whose length is equal substantially to one-half the circumference of the outer tubular member 13, whereas the length of the elongated aperture 18 in the coupling 10 is substantially twice the diameter of the shank 29 of the detent member 22. The elimination of the guide pin 19 and the notch 21 and making the length of the aperture 118 substantially one-half the circumference of the outer tubular member 13 permits swiveling of the coupling 110.

In the coupling 10 the circumferential length of the aperture 18 is shown and preferably is slightly longer than the circumferential length of the rib 36 in the closure sleeve 32, and the width of the rib is slightly less than width of the aperture or slot 18. Thus, the area of the aperture or slot 18 is slightly larger than the end area of the rib 36, whereby the rib 36 may be pressed within the confines of the aperture 18.

It is to be noted that the construction of the improved coupling 10 may be incorporated in a coupling in which the inner tubular member has a wall having the same thickness as the wall of the outer tubular member. In other words, the construction and operation of the improved tubular coupling of the present invention is independent of the thickness of the walls of the inner and outer telescoping tubular members.

In the foregoing description, certain terms have been used for brevity, clearness, and understanding, but no unnecessary limitations are to be implied therefrom beyond the requirments of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. In a tubular coupling, an outer tubular member and an inner tubular member, the tubular members being arranged for separable telescoping jointure with each other, each of the tubular members having formed therein an aperture registrable with the aperture of the other, a detent member located in the aperture of the inner tubular member and extendable into the aperture of the outer tubular member when the apertures are registered with each other and thereby connecting the tubular members with each other, spring means on the inside of the inner tubular member supporting the detent member in the aperture of the inner tubular member and resiliently urging the detent member outwardly, a resilient closure sleeve located on the outer tubular member in airtight engagement therewith, the closure sleeve extending beyond the end of the outer tubular member, and the closure sleeve including a gripping ring portion beyond the outer end of the outer tubular member, and the gripping ring portion being adapted for making a gripping closure engagement with the entire circumference of the inner tubular member when the tubular members are telescoped with each other, the closure sleeve having an inner surface with a cavity formed therein, the cavity opening over the aperture of the outer tubular member, and the closure sleeve including in its cavity a circumferential rib located outwardly of the aperture of the outer tubular member, the detent member having an outer end face and the rib being adapted for being pressed against the outer end face of the detent member when the tubular members are connected with each other, so as to press the detent member inwardly and permit withdrawal of the inner tubular member from the outer tubular member.

2. In a tubular coupling, an outer tubular member and an inner tubular member, the tubular members being arranged for separable telescoping jointure with each other, each of the tubular members having formed therein an aperture registrable with the aperture of the other, a detent member located in the aperture of the inner tubular member and extendable into the aperture of the outer tubular member when the apertures are registered with each other and thereby connecting the tubular members with each other, spring means on the inside of the inner tubular member supporting the detent member in the aperture of the inner tubular member and resiliently urging the detent member outwardly, a resilient closure sleeve located on the outer tubular member in airtight engagement therewith, the closure sleeve extending beyond the end of the outer tubular member, and the closure sleeve including a gripping ring portion beyond the outer end of the outer tubular member, and the gripping ring portion being adapted for making a gripping closure engagement with the entire circumference of the inner tubular member when the tubular members are telescoped with each other, the closure sleeve having an inner surface with a cavity formed therein, the cavity opening over the aperture of the outer tubular member, and the closure sleeve including in its cavity a circumferential rib located outwardly of the aperture of the outer tubular member, the detent member having an outer end face and the rib being adapted for being pressed against the outer end face of the detent member when the tubular members are connected with each other, so as to press the detent member inwardly and permit withdrawal of the inner tubular member from the outer tubular member, and the detent member having a curved corner portion on its outer end face.

3. In a tubular coupling, an outer tubular member and an inner tubular member, the tubular members being arranged for separable telescoping jointure with each other, each of the tubular members having formed therein an aperture registrable with the aperture of the other, a detent member located in the aperture of the inner tubular member and extendable into the aperture of the outer tubular member when the apertures are registered with each other and thereby connecting the tubular members with each other, spring means on the inside of the inner tubular member supporting the detent member in the aperture of the inner tubular member and resiliently urging the detent member outwardly, a resilient closure sleeve located on the outer tubular member in airtight engagement therewith, the closure sleeve extending beyond the end of the outer tubular member, and the closure sleeve including a gripping ring portion beyond the outer end of the outer tubular member, and the gripping ring portion being adapted for making a gripping closure engagement with the entire circumference of the inner tubular member when the tubular members are telescoped with each other, the closure sleeve having an inner surface with a cavity formed therein, the cavity opening over the aperture of the outer tubular member, and the closure sleeve including in its cavity a circumferential rib located outwardly of the aperture of the outer tubular member, the detent member having an outer end face and the rib being adapted for being pressed against the outer end face of the detent member when the tubular members are connected with each other, so as to press the detent member inwardly and permit withdrawal of the inner tubular member from the outer tubular member, and the detent member having a curved peripheral corner portion on its outer end face.

4. In a tubular coupling, an outer tubular member and an inner tubular member, the tubular members being arranged for separable telescoping jointure with each other, each of the tubular members having formed therein an aperture registrable with the aperture of the other, a detent member located in the aperture of the inner tubular member and extendable into the aperture of the outer tubular member when the apertures are registered with each other and thereby connecting the tubular members with each other, spring means on the inside of the inner tubular member supporting the detent member in the aperture of the inner tubular member and resiliently urging the detent member outwardly, a resilient closure sleeve located on the outer tubular member in airtight engagement therewith, the closure sleeve extending beyond the end of the outer tubular member, and the closure sleeve including a gripping ring portion beyond the outer end of the outer tubular member, and the gripping ring portion being adapted for making a gripping closure engagement with the entire circumference of the inner tubular member when the tubular members are telescoped with each other, the closure sleeve having an inner surface with a cavity formed therein, the cavity opening over the aperture of the outer tubular member, and the closure sleeve including in its cavity a rib located outwardly of the aperture of the outer tubular member, the detent member having an outer end face and the rib being adapted for being pressed against the outer end face of the detent member when the tubular members are connected with each other, so as to press the detent member inwardly and permit withdrawal of the inner tubular member from the outer tubular member, and the aperture in the outer sleeve having an area greater than the end area of the rib.

5. In a tubular coupling, an outer tubular member and an inner tubular member, the tubular members being arranged for separable telescoping jointure with each other, each of the tubular members having formed therein an aperture registrable with the aperture of the other, a detent member located in the aperture of the inner tubular member and extendable into the aperture of the outer tubular member when the apertures are registered with each other and thereby connecting the tubular members with each other, spring means on the inside of the inner tubular member supporting the detent member in the aperture of the inner tubular member and resiliently urging the detent member outwardly, a resilient closure sleeve located on the outer tubular member and sealing the telescoped inner and outer tubular members in airtight relation, the closure sleeve having an inner surface with a cavity formed therein, the cavity opening over the aperture of the outer tubular member, and the closure sleeve including in its cavity a rib located outwardly of the aperture of the outer tubular member, the detent member having an outer end face and the rib being adapted for being pressed against the outer end face of the detent member when the tubular members are connected with each other, so as to press the detent member inwardly and permit withdrawal of the inner tubular member from the outer tubular member.

EUGENE F. MARTINET.

REFERENCES CITED

The following references are of record in the file of this patent:

UNITED STATES PATENTS

| Number | Name | Date |
|---|---|---|
| 2,245,151 | Martinet | June 10, 1941 |
| 2,523,770 | Marette | Sept. 26, 1950 |